United States Patent

Håkansson et al.

[11] Patent Number: 5,979,582
[45] Date of Patent: Nov. 9, 1999

[54] CRUISE CONTROL FOR MOTOR VEHICLES

[75] Inventors: Nils Olof Håkansson, Stenkullen; Gösta Andersson, Uddevalla, both of Sweden

[73] Assignee: AB Volvo, Gothenburg, Sweden

[21] Appl. No.: 08/952,454

[22] PCT Filed: May 31, 1996

[86] PCT No.: PCT/SE96/00719

§ 371 Date: Nov. 17, 1997

§ 102(e) Date: Nov. 17, 1997

[87] PCT Pub. No.: WO96/40534

PCT Pub. Date: Dec. 19, 1996

[30] Foreign Application Priority Data

Jun. 7, 1995 [SE] Sweden .................................. 9502083

[51] Int. Cl.[6] .................................................. B60K 31/00
[52] U.S. Cl. ........................ 180/170; 180/178; 180/179; 701/93
[58] Field of Search .................... 180/170, 178, 180/179; 701/93, 96, 110

[56] References Cited

U.S. PATENT DOCUMENTS

| 2,127,454 | 8/1938 | Wolfe et al. .............................. 180/178 |
| 4,535,864 | 8/1985 | Tanigawa et al. . |
| 4,796,716 | 1/1989 | Masuda .................................... 180/170 |
| 4,856,609 | 8/1989 | Naito ........................................ 180/179 |
| 5,019,986 | 5/1991 | Londt et al. . |
| 5,634,446 | 6/1997 | Rauznitz ................................... 180/179 |

FOREIGN PATENT DOCUMENTS

| 43 13 685 | 9/1993 | Germany . |
| 43 20 111 | 12/1994 | Germany . |

Primary Examiner—J. J. Swann
Assistant Examiner—James S. McClellan
Attorney, Agent, or Firm—Young & Thompson

[57] ABSTRACT

Cruise control for regulating the speed of a motor vehicle with a processing unit (14) and a manually actuatable operating element (20), wherein a selected speed can be set. On the operating element there is a switch (23), wherein the driver can select if the selected speed is to be kept constant of if it is to constitute a minimum speed or a maximum speed. There is also a switch (24, 25), wherein a permitted overspeed above a selected maximum speed can be set, so that a higher speed can be allowed when driving downhill, for the purpose of saving energy.

6 Claims, 1 Drawing Sheet

CRUISE CONTROL FOR MOTOR VEHICLES

BACKGROUND OF THE INVENTION

The present invention relates to a device for regulating the speed of a motor vehicle provided with a braking device, comprising a control actuatable by the driver of the vehicle, with first means for setting a command value for a speed, a sensor for sensing the actual value of the speed and a processing unit connected to the engine throttle and to the braking device, said command value and actual value being fed into and compared in said processing unit, which is disposed to send signals to the throttle and/or brake device depending on the difference between said values, said processing unit being disposed when driving downhill to allow a maximum speed, which lies above the command value set by means of the first means.

SUMMARY OF INVENTION

Devices for controlling vehicle speed by controlling the throttle opening, so-called cruise controls, are generally known and are available in both passenger vehicles and trucks. They are capable of maintaining constant vehicle speed on a level road and when driving uphill, but allow the vehicle to exceed the set speed when driving downhill. An automatic brake control function has also recently been introduced, especially in heavy trucks and buses with so-called auxiliary brakes, e.g. retarders, exhaust brakes and decompression brakes. Different systems are known. In the simplest one, the driver sets the minimum speed with the ordinary cruise control and the maximum speed, i.e. the speed at which the auxiliary brake is activated, is set with a separate control. In another system, these functions are integrated in a single control, whereby a certain excess speed on the order of 5–10 km/h is allowed before the braking device is activated.

When driving on varying level and hilly roads with the integrated cruise control in the automatic position, the throttle opening will strive to maintain the set speed up to the crest of a hill and will activate the braking devices as soon as the allowed excess speed has been reached after the crest. This results in poor fuel economy because a portion of the kinetic energy of the vehicle on and immediately before the crest of the hill will be immediately braked off and not be used for driving the vehicle. An active driver can of course deactivate the cruise control just before the crest of the hill, so that it no longer strives to maintain or at least not increase the vehicle speed, utilizing the kinetic energy of the vehicle to carry it over the crest, and thereafter once again activate the cruise control to re-establish the brake function. Hitherto known cruise controls of the type in question do not, however, have controls and control functions which directly encourage such active operation.

The purpose of the present invention is in general to achieve a device of the type described by way of introduction, which has a control and control functions which are particularly suited for an active and economical method of operation.

This is achieved according to the invention by virtue of the fact that the cruise control has second means for setting to a first position, in which the processing unit controls both the throttle and the brake device to keep the vehicle speed constant, a second position, in which the processing unit only controls the throttle to keep a minimum speed which is the set command value, and a third position, in which the processing unit only controls the braking device to limit the maximum speed in relation to the set command value.

With the aid of the control according to the invention, the driver can simply shift between speed control, which regulates both the throttle opening and the brake, and regulating only one of these. If the vehicle is driven uphill followed more or less immediately by a downhill stretch, a driver who knows the road can shift the control from the first to the third position prior to the crest. After passing the crest of the hill, he will not need to shift the control, since the braking function is activated in the third position.

In a further developed, preferred embodiment of the device according to the invention, the control has third means which are disposed to permit selection of various maximum speeds above the command value set by the first means. In order to always give the driver full command of which "overspeed" is set, the control is coordinated by an instrument, preferably integrated in the vehicle speedometer, on which there can be directly read the command speed value set by the first means and the "overspeed" selected by means of the second means.

DETAILED DESCRIPTION OF THE DRAWINGS

Figure 1:
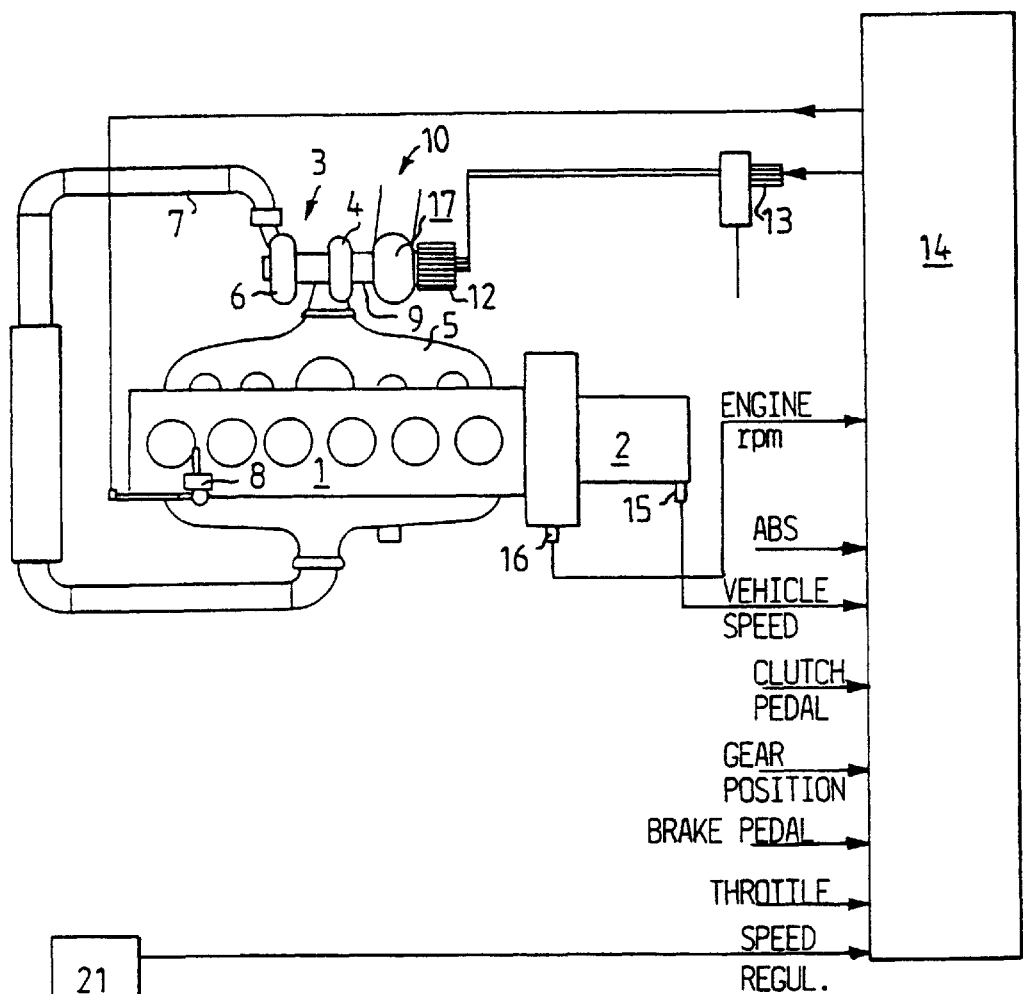
FIG. 1. shows schematically a turbo-charged diesel engine with a device according to the invention.
Figure 2:
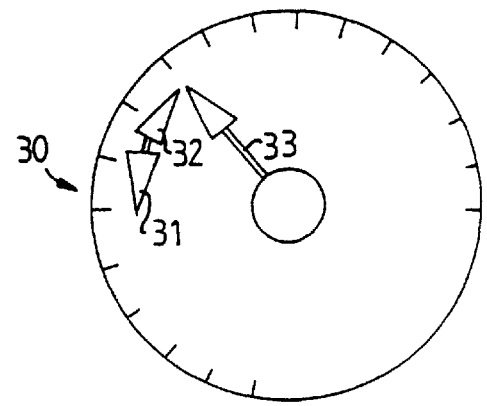
FIG. 2. shows a schematic view of a speedometer dial.

The invention will be described below with reference to examples shown in the accompanying drawings, where FIG. 1 shows schematically a turbo-charged diesel engine with a device according to the invention, and FIG. 2 shows a schematic view of a speedometer dial.

In FIG. 1, 1 designates a six cylinder diesel engine with a gearbox 2 connected thereto. A turbo-compressor generally designated 3 has its turbine portion 4 connected to the engine exhaust manifold 5 and its compressor portion 6 connected to the engine air intake 7. The engine 1 has a schematically indicated compression brake device 8, which can be of the type which is shown and described in SE 466 320, and by means of which the engine cylinders, during the latter portion of the intake stroke, as well as during the latter portion of the compression stroke, can be connected to the engine exhaust manifold to increase the engine braking effect. For a more detailed description of the construction and functioning of a conceivable embodiment of the compression braking device 8, reference is thus made to SE 466 320.

The outlet 9 of the turbine 4 opens into an exhaust pressure regulator, generally designated 10, which can be of a type known per se and comprises a shutter housing 17 containing a shutter (not shown) and a pneumatic control means 12 connected to the shutter. The pneumatic control means 12 communicates via a control valve 13 with a source of compressed air, e.g. the pressure tank for the vehicle brake system. With the aid of the control means 12, the shutter can be set continuously between a completely open and a completely closed position.

A processing unit 14, which is preferably a microprocessor, sends output signals for throttle opening and/or turning on/off the compression brake device or for setting the shutter of the exhaust pressure regulator, depending on a number of signals fed to the processing unit from a number of sensors, of which only two are shown in FIG. 1, namely a vehicle speed sensor 15 and an engine speed sensor 16. From the other sensors (not shown), signals are sent representing ABS on/off, clutch pedal position, gear selector position, brake pedal position, accelerator position and setting of a cruise control or speed regulator generally designated 20.

The cruise control operating means 20 comprises an operating lever 22 pivotally joined to a data supply unit 21 and can suitably be mounted on the vehicle steering column (not shown). The operating lever 22 can be pivoted upwards, downwards, forwards or backwards from a neutral position N, and signals representing "on", "off", "throttle opening" and "brake" are sent to the processing units as indicated by the arrows in FIG. 1. The operating lever 22 has on it a switch 23 which has three different positions −A, A and +A, where the position A means that the cruise control function is engaged, i.e. both the automatic throttle opening function and the automatic braking function are activated. In position −A, only the maximum speed is limited via activated automatic braking function, while in position +A, only the minimum speed is limited via an activated automatic throttle opening function. On the operating lever 22 there is an additional switch represented by the buttons 24, 25, by means of which a speed above the basic speed set by the operating lever 22 can be selected. This overspeed is the speed which the vehicle can be allowed to reach when driving downhill, before the automatic braking function is activated.

With the switch 23 in position A, the driver activates the constant speed function by moving the lever 22 upwards. The speed is locked to the speed which the vehicle has at the moment. With the aid of the buttons 24, 25, the driver can set the allowable overspeed within a permissible interval, e.g. from 0 to 15 km/h. If the speed is locked at, for example, 80 kmh and an overspeed of 10 km/h is set, this means that the maximum downhill speed in position −A is limited to 90 km/h. An active driver approaching a downhill stretch can simply switch from position A to position −A in order to utilize the "free energy" which the overspeed provides when going downhill. When the vehicle is once again on level ground or at the beginning of an uphill stretch, the driver will return the switch 23 to position A for maintaining constant speed until, for example, just before the crest of an uphill stretch with a subsequent downhill stretch, where the switch 23 will again be set to position −A, so that the throttle will not be opened over the crest and so that the overspeed can be reached without throttle opening. The position −A is thus suitably used to store energy when driving downhill, where the maximum speed for driving in position +A (minimum speed) would otherwise risk becoming too high. On stretches of road which are more or less level, where there is no risk that the vehicle speed will exceed the maximal allowable speed for driving downhill, the switch 23 is suitably set to position +A so that extra kinetic energy is not braked off unnecessarily. The driver can thus in a simple manner, by throwing the switch 23, adapt the automatic cruise control to road conditions and current speed limits.

In order to enable the driver to always have full control of both the set command value speed (minimum speed) and the set allowable overspeed, and the choice −A/A/+A, the operating means 20 is coupled to an indicator integrated into the vehicle speedometer 30 (see FIG. 2) and which comprises LEDS, the lower one 31 of which in FIG. 2 indicates the set command value speed and the upper one 32 of which is set to the maximum allowable overspeed. As can be seen by the position of the hand 33 on the speedometer, the vehicle has here reached said overspeed, at which the brake is activated at positions A and −A. To raise the command value speed, the lever 22 is flipped in the direction "open throttle". A reduction in the command value speed is obtained by turning the lever in the direction "brake". The braking effect can thus be varied in the known manner depending on how far from the neutral position 0 towards the maximum effect 4 the lever 22 is swung.

We claim:

1. Device for regulating the speed of a motor vehicle provided with a braking device, comprising a control (20) actuatable by the driver of the vehicle, with first means (22) for setting a command value for a speed, a sensor (16) for sensing the actual value of the speed and a processing unit (14) connected to the engine throttle and to the braking device (8,10), said command value and actual value being fed into and compared in said processing unit, which is disposed to send signals to an throttle and brake device depending on the difference between said values, said processing unit being disposed when driving downhill to allow a maximum speed, which lies above the command value set by of the first means, characterized in that the control (20) has a second means (23) for setting to a first position, in which the processing unit (14) controls both the throttle and the brake device (8,10) to keep the vehicle speed constant, a second position, in which the processing unit only controls the throttle to keep a minimum speed which is the set command value, and a third position, in which the processing unit only controls the braking device to limit the maximum speed in relation to the set command value.

2. Device according to claim 1, characterized in that the operating means (20) has third means (24, 25), which are disposed to provide a choice of various maximum speeds above the command value set by means of the first means.

3. Device according to claim 1, characterized in that the operating means (20) are coordinated with an instrument (31), on which the command value speed, set by means of the first means (22), is readable.

4. Device according to claim 2, characterized in that the operating means are coordinated with an instrument (31, 32), on which the command value speed, set by means of the first means (22) and the preselected allowed speed above the command value speed selected by means of the third means (24, 25), are readable.

5. Device according to claim 4, characterized in that the instrument (31, 32) is integrated in the vehicle speedometer (30) and is arranged to indicate the command value speed and the preselected speed thereabove in connection with the ordinary speed dial on the speedometer.

6. Device according to claim 1 in a vehicle driven by an internal combustion engine with a compression brake device (8) and a device (10) for varying the degree of charge, characterized in that the processing unit (14) is disposed to provide a signal to the device (10) for varying the degree of charge, said signal representing one of several possible brake effects selectable by means of the operating means.

\* \* \* \* \*